(12) United States Patent
Hu

(10) Patent No.: US 7,775,593 B2
(45) Date of Patent: Aug. 17, 2010

(54) ADJUSTING DEVICE OF A CHAIR BACKREST

(76) Inventor: Jung-Hua Hu, P.O. Box 90, Tainan City 70499 (TW)

( * ) Notice: Subject to any disclaimer, the term of this patent is extended or adjusted under 35 U.S.C. 154(b) by 72 days.

(21) Appl. No.: 12/248,055

(22) Filed: Oct. 9, 2008

(65) Prior Publication Data

US 2010/0090512 A1    Apr. 15, 2010

(51) Int. Cl.
*B60N 2/02* (2006.01)
(52) U.S. Cl. ...................................... 297/353
(58) Field of Classification Search ............... 297/410, 297/353, 411.36; 248/408, 407, 423
See application file for complete search history.

(56) References Cited

U.S. PATENT DOCUMENTS

| | | | | |
|---|---|---|---|---|
| 4,639,039 A | * | 1/1987 | Donovan | 297/353 |
| 4,749,230 A | * | 6/1988 | Tornero | 297/353 |
| 5,884,876 A | * | 3/1999 | Axford | 248/48.2 |
| 6,155,643 A | * | 12/2000 | Gorgi et al. | 297/353 |
| 6,585,322 B1 | * | 7/2003 | Lai | 297/411.36 |
| 7,360,837 B1 | * | 4/2008 | Liu | 297/353 |

* cited by examiner

*Primary Examiner*—Milton Nelson, Jr.

(57) ABSTRACT

An adjusting device of a chair backrest includes a movable base, a connecting block and a positioning unit. The movable base encompasses an adjusting opening having plural continuous V-shaped grooves in two vertical sidewalls, a stopping groove and a projecting-downward portion, and two sliding rails. The connecting block is fitted in the movable base, possessing a rectangular recess. The positioning unit is installed in the rectangular recess, having two upholding feet fixed with the connecting block and respectively having a locking projection and a locking groove corresponding to each other. A spring is put between the upholding feet to elastically expand them. With the movable base fixed with the backrest and the connecting block fixed with a connecting rod, the movable base can be moved up and down together with the backrest, with the height of the backrest adjusted.

9 Claims, 9 Drawing Sheets

ADJUSTING DEVICE OF A CHAIR BACKREST

BACKGROUND OF THE INVENTION

1. Field of the Invention

This invention relates to an adjusting device of a chair backrest, particularly to one able to smoothly adjust the height of the backrest and keep it securely positioned at the adjusted height.

2. Description of the Prior Art

Commonly, most of conventional chairs have the seat and the backrest immovably made, not adjustable. Or, another one has the backrest possible to be altered with diverse inclined angles so as to meet a user's preference. However, as the backrest of a conventional chair is always positioned at a certain level, it cannot be adjusted to change its vertical position in accordance with a user's posture or height to effectively support his back.

SUMMARY OF THE INVENTION

The object of this invention is to offer an adjusting device employed to smoothly adjust the height of a chair backrest and keep it securely positioned at the adjusted height.

The first characteristics of the invention are a movable base, a connecting block and a positioning unit. The movable base is provided with an adjusting opening having plural V-shaped grooves on two sidewalls, a stopping groove at its bottom and a projecting-downward portion at its top, and a sliding rail formed at its two sides respectively. The connecting block is fitted in the movable base, provided with a side wing formed at its two sides respectively for plugging inside the sliding rail of the movable base, and a rectangular recess formed in its front wall with a projection and a through hole bored below the projection. The positioning unit is installed in the rectangular recess of the connecting block, provided with two upholding feet respectively having a pivotal hole for being inserted through with a pivotal pin that is then fixed with a washer by pressing to keep the positioning unit fixed with the connecting block. The upholding feet respectively have a locking projection and a locking groove corresponding to each other. A spring is put between the upholding feet to elastically expand them wide open.

The second characteristics of the invention are a movable base, a connecting rod of a chair and a positioning unit. The movable base is provided with an adjusting opening having plural continuous V-shaped grooves at two sidewalls respectively, a stopping groove at its bottom and a projecting-downward portion at its top, and a sliding rail formed at its two sides respectively. The connecting rod is fitted in the movable base, provided with a side wing formed at its two sides respectively for plugging inside the sliding rail of the movable base, and a rectangular recess formed in its front wall with a projection and a through hole bored below the projection. The positioning unit is installed in the rectangular recess of the connecting rod, provided with two upholding feet respectively having a pivotal hole for being inserted through with a pivotal pin that is then fixed with a washer by pressing to keep the positioning unit fixed with the connecting rod. The upholding feet respectively have a locking projection and a locking groove corresponding to each other. A spring is put between the upholding feet to elastically expand them wide open.

BRIEF DESCRIPTION OF DRAWINGS

This invention is better understood by referring to the accompanying drawings, wherein.

DETAILED DESCRIPTION OF THE PREFERRED EMBODIMENT

Figure 1:
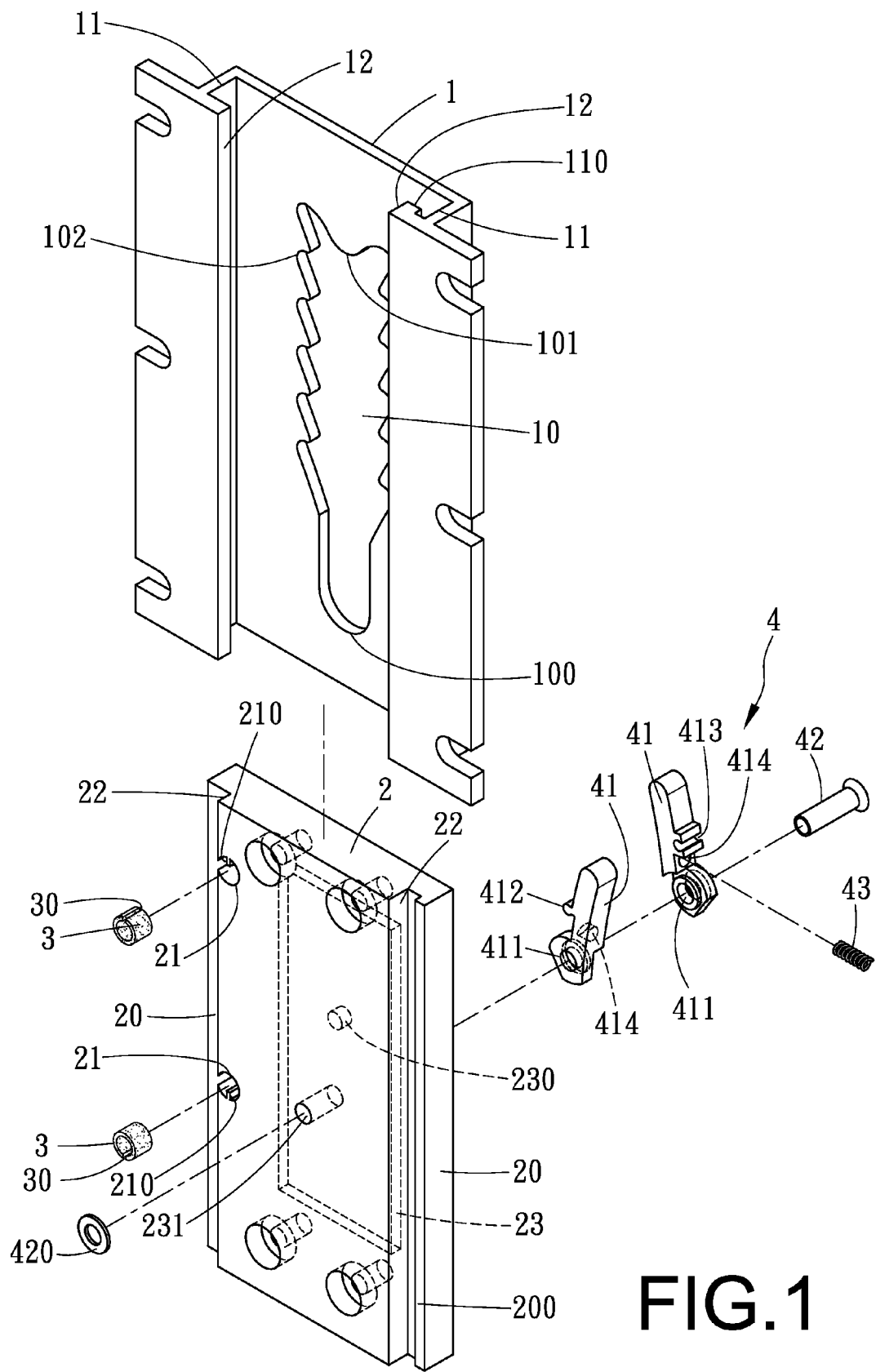
FIG. 1 is an exploded perspective view of a first preferred embodiment of an adjusting device of a chair backrest in the present invention.

As shown in FIG. 1, a first preferred embodiment of an adjusting device of a chair backrest in the present invention includes a movable base 1, a connecting block 2, at least a stabilizing ring 3 and a positioning unit 4.

The movable base 1 is provided with an adjusting opening 10 in an intermediate portion of a front wall, a sliding rail 11 formed in its two vertical sides respectively, and an inner wall 12 formed to extend sidewise from each of the sliding rails in parallel to the front wall. The adjusting opening 10 has a sequence of plural V-shaped grooves 102 in two vertical sidewalls respectively, its bottom portion formed with a stopping groove 100 and its top end formed with a projecting-downward portion 101. One of the sliding rails 11 is provided with a long blocking wall 110 vertically projected from its inner end.

The connecting block 2 is fitted in the movable base 1, provided with a side wing 20 formed at two vertical sides respectively for plugging inside the sliding rail 11 of the movable base 1, at least a circular notch 21 cut in its one side, a side wall 22 formed at its two vertical sides respectively, and a rectangular recess 23 formed in its front wall. One of the side wings 20 has a long projecting ridge 200 employed to correspond to the blocking wall 110 of the sliding rail 11 of the movable base 1. Protruded from the inner wall of the notch 21 is a locking projection 210. The rectangular recess 23 is provided with a projection 230 formed in an intermediate portion and a through hole 231 bored below the projection 230.

The stabilizing ring 3 is fitted in the notch 21 of the connecting block 2, provide with a slot 30 used for engaging with the locking projection 210 of the notch 21, preferably made of plastics.

The positioning unit 4 is assembled within the rectangular recess 23 of the connecting block 2, provided with two upholding feet 41 respectively bored with a pivotal hole 411, a pivotal pin 42 used to be inserted through the pivotal holes 411 of the upholding feet 41 and the through hole 231 of the connecting block 2 and then fixed with a washer 420 by pressing, and a spring 43. One of the upholding feet 41 is provided with a locking projection 412 and the other one is provided with a locking groove 413 for correspondingly engaging with the locking projection 412. And, each of the upholding feet 41 is provided with a spring groove 414 formed in its inner wall for receiving the spring 43 therein.

Figure 2:
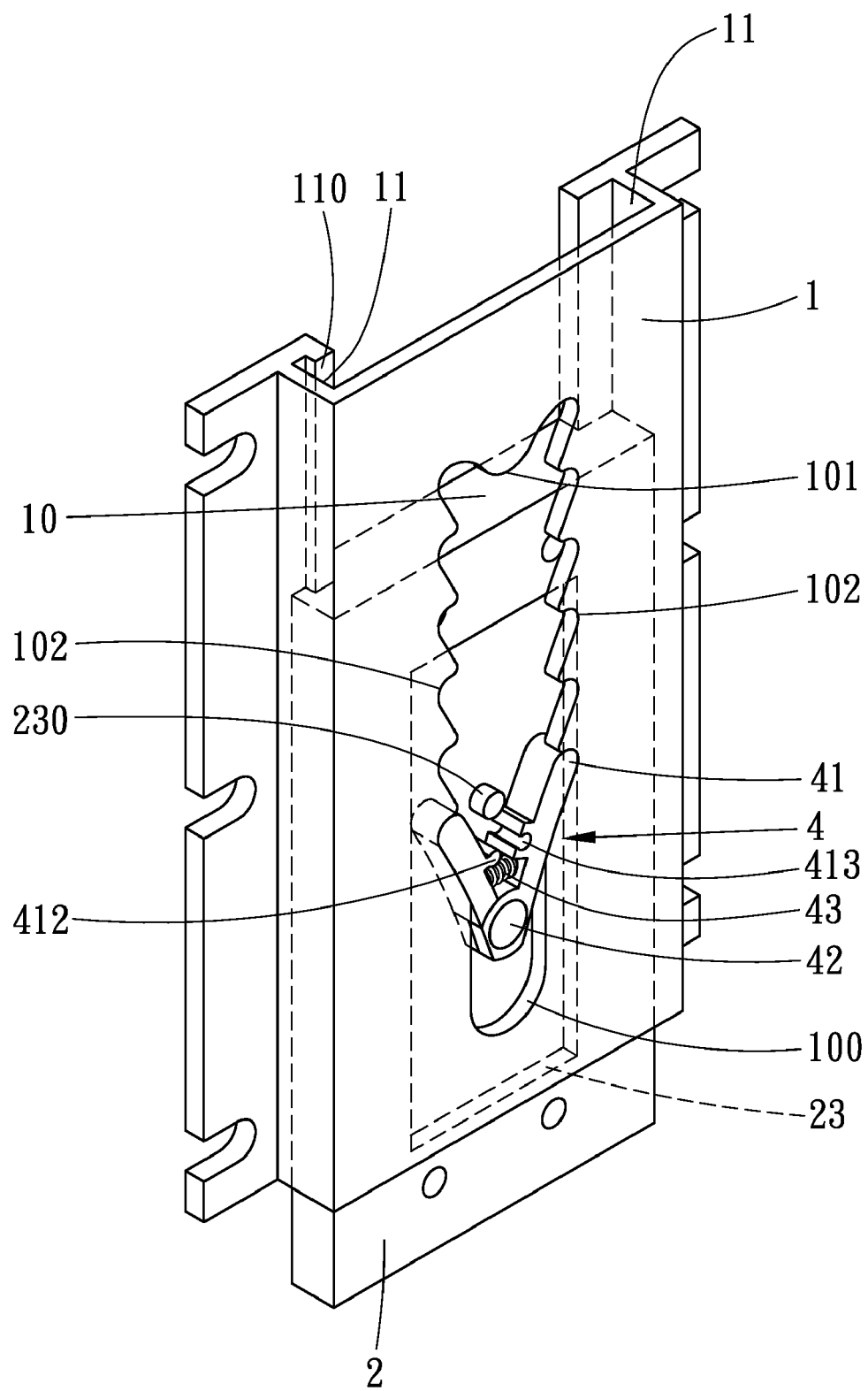
FIG. 2 is a perspective view of the first preferred embodiment of an adjusting device of a chair backrest in the present invention.
Figure 3:
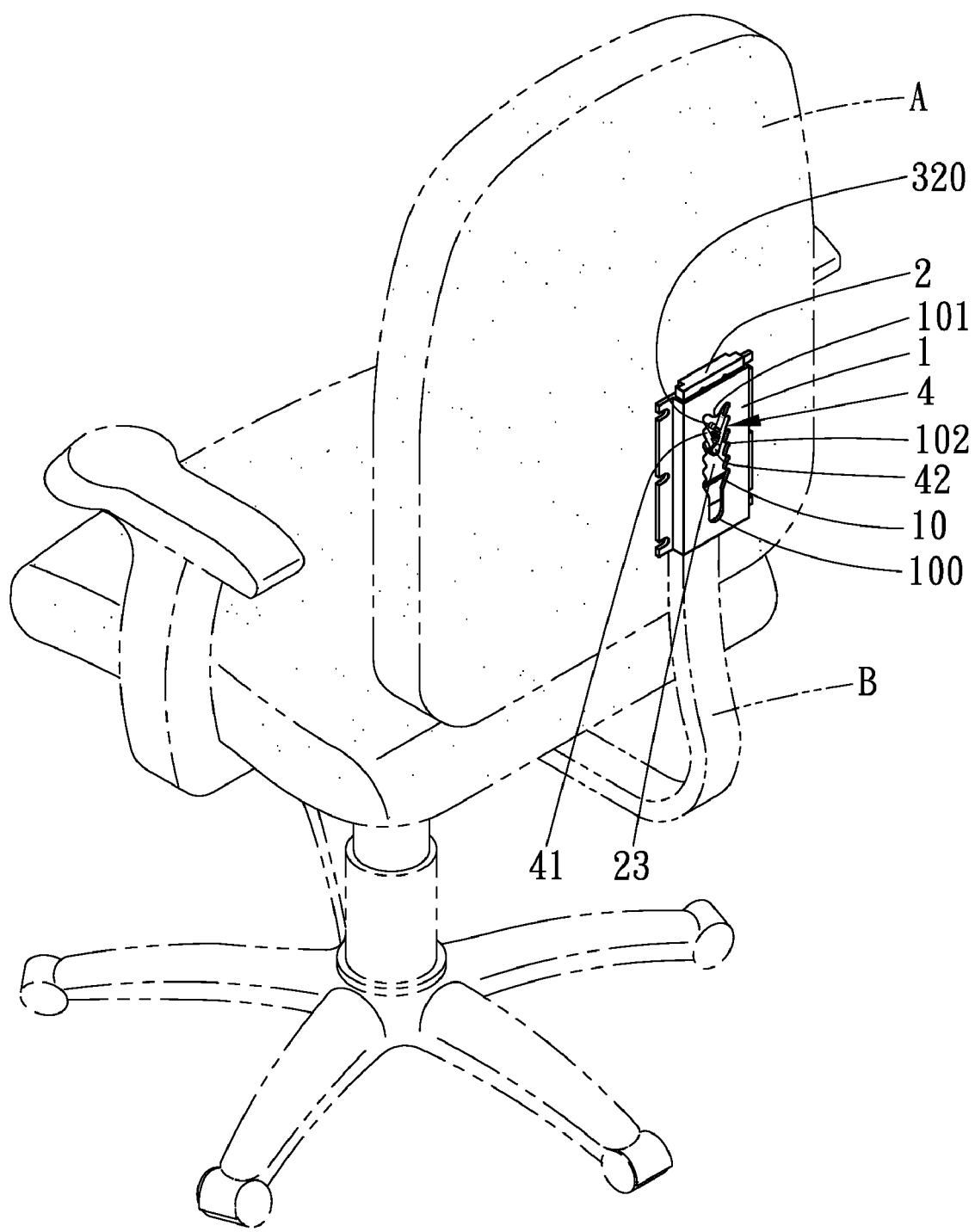
FIG. 3 is a perspective view of the first preferred embodiment of an adjusting device of a chair backrest in the present invention, showing it being installed on the backrest.
Figure 4:
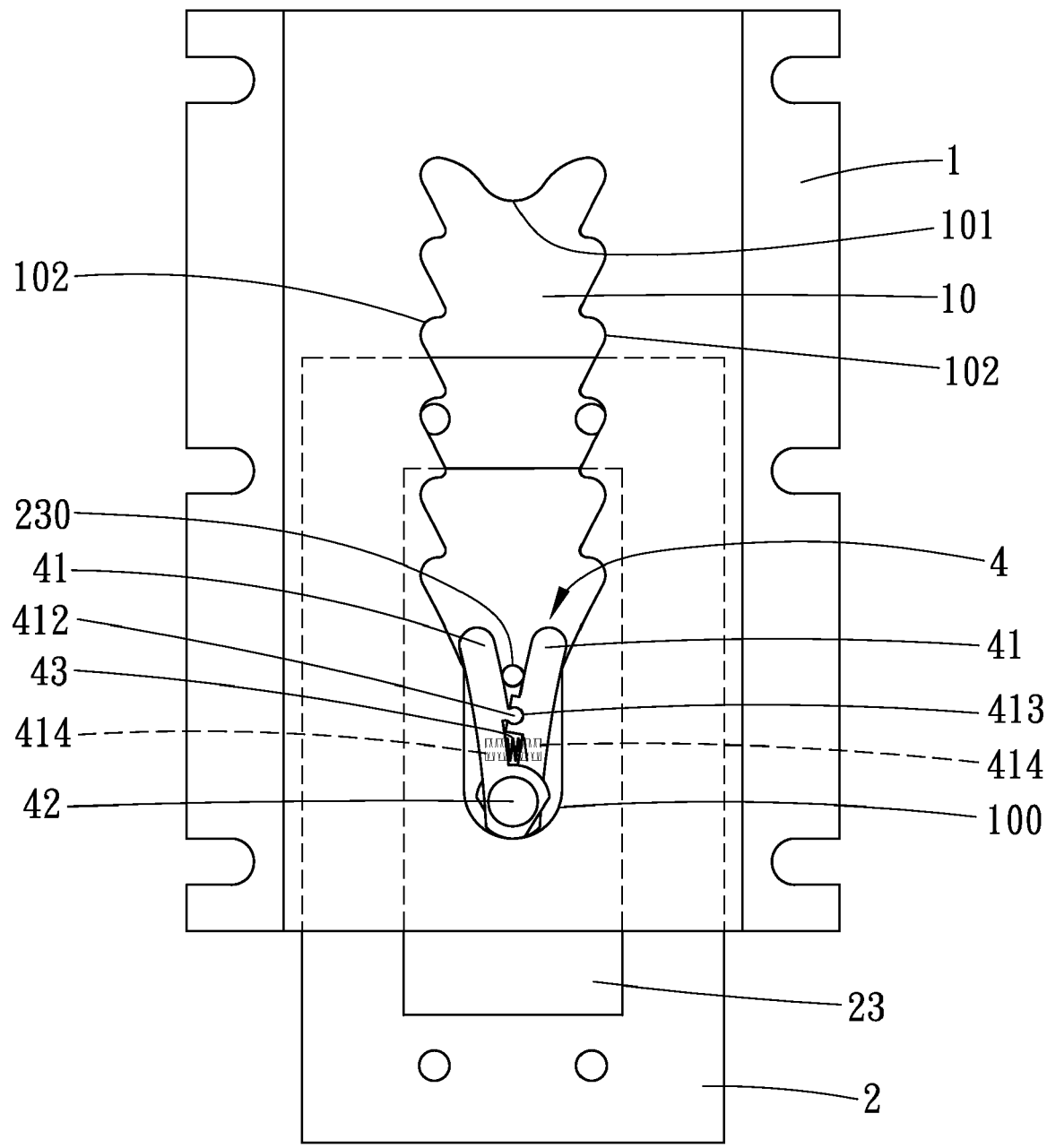
FIG. 4 is a front view of the first preferred embodiment of an adjusting device of a chair backrest in the present invention, showing it being adjusted to raise a movable base to a highest level.
Figure 5:
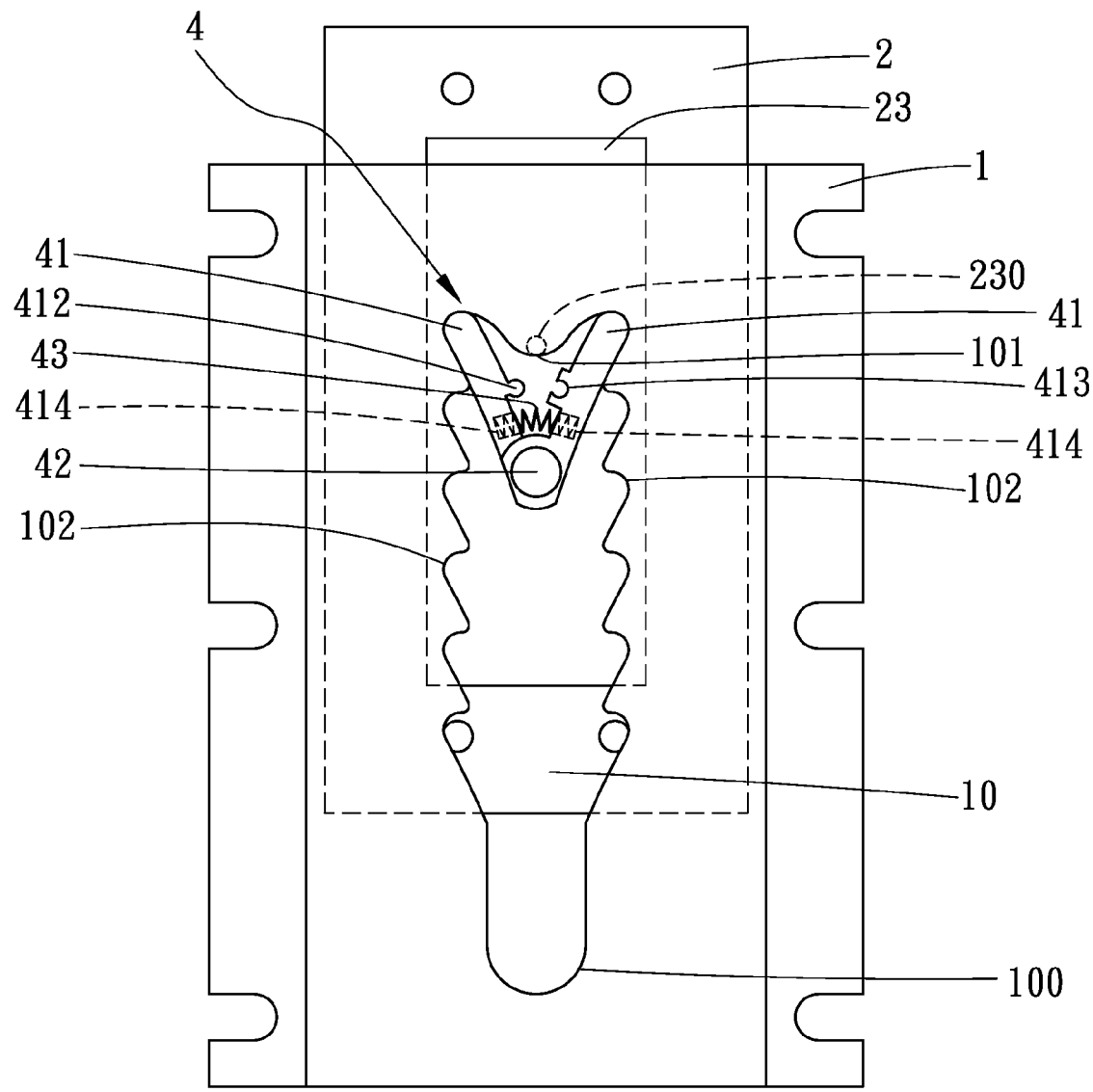
FIG. 5 is a front view of the first preferred embodiment of an adjusting device of a chair backrest in the present invention, showing it being adjusted to move the movable base to a lowest level.
Figure 6:
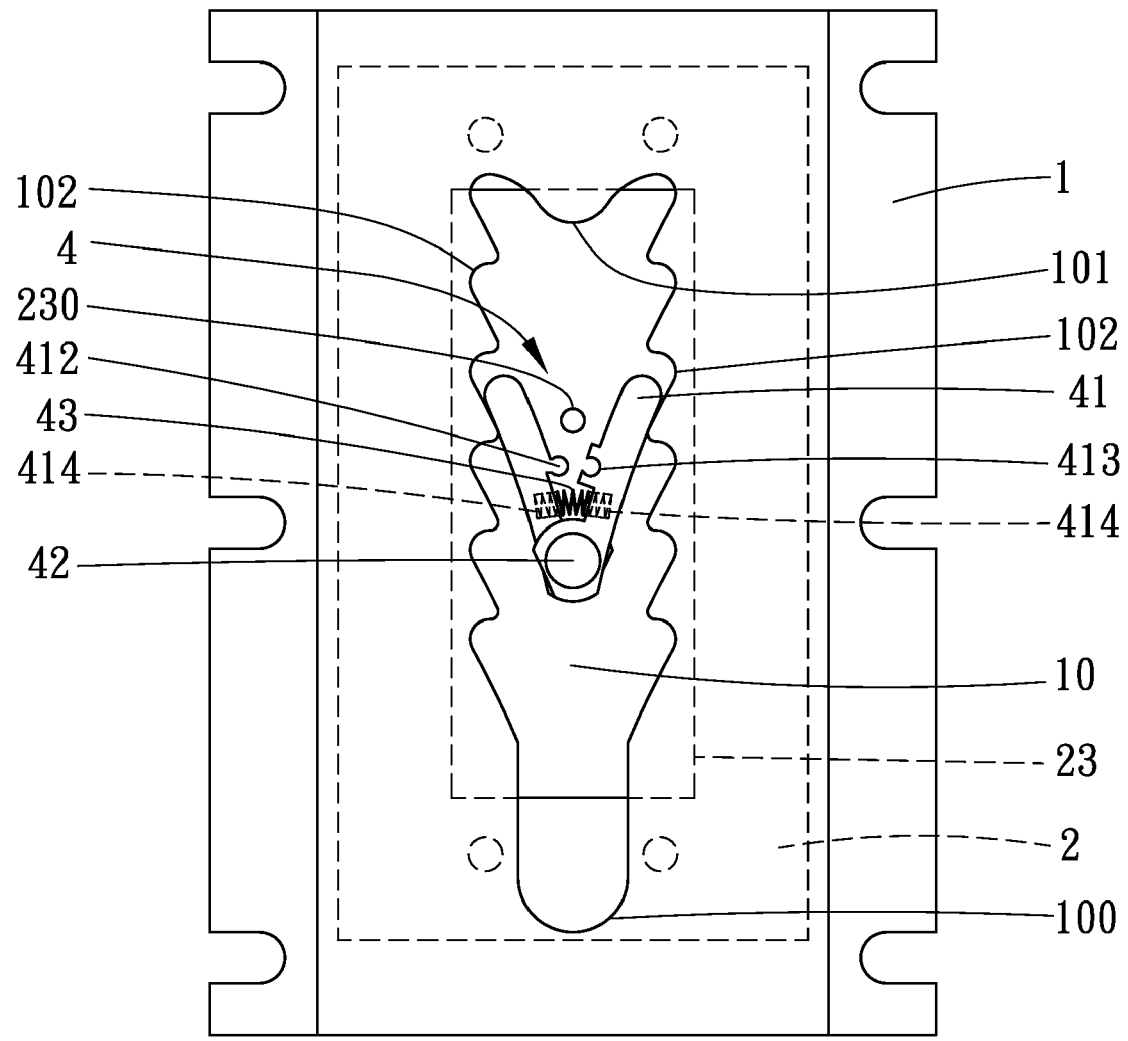
FIG. 6 is a front view of the first preferred embodiment of an adjusting device of a chair backrest in the present invention, showing it being adjusted to lower the movable base.
Figure 7:
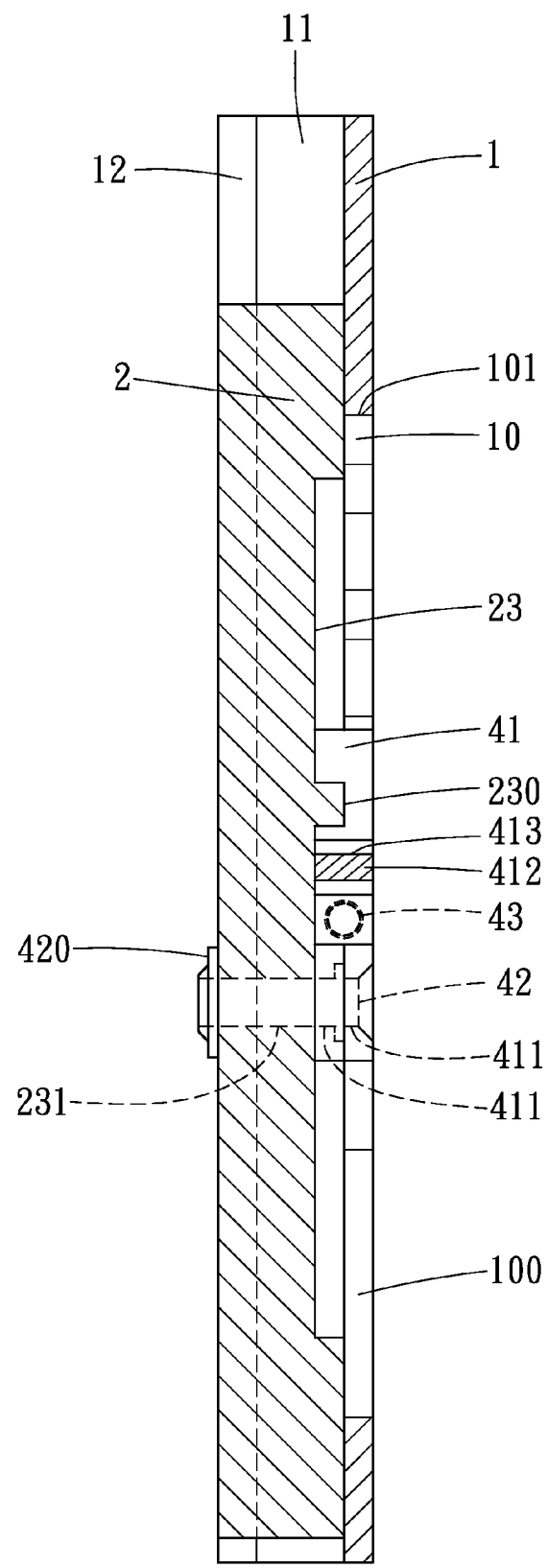
FIG. 7 is a side cross-sectional view of the first preferred embodiment of an adjusting device of a chair backrest in the present invention.

In assembling the adjusting device, as shown in FIGS. 1~3, the stabilizing ring 3 is first fitted in the notch 21 of the connecting block 2, with the slot 30 of the stabilizing ring 3 engaged with locking projection 210 of the notch 21, keeping the stabilizing ring 3 slightly protruded above the sidewalls 22 of the connecting block 2 so as to lean against the inner wall 12 of the movable base 1. Next, two ends of the spring 43 are put into the spring grooves 414 of the upholding feet 41, with the pivotal holes 411 of the upholding feet 41 exactly corresponding to each other and the locking projection 412 fitted in the locking groove 413. Then, the previously assembled components of the positioning unit 4 is installed in the rectangular recess 23, with the projection 230 positioned between the upholding feet 41 to keep the pivotal holes 411 exactly corresponding to the through hole 231. The pivotal pin 42 is successively inserted through the pivotal holes 411 and the through hole 231 and then fixed with washer 420 by pressing. Finally, the movable base 1 is fixed on a backrest (A) and the connecting block 2 is connected with a connecting rod (B) of a chair.

As shown in FIGS. 3~7, when the backrest (A) is to be altered in its level, the backrest (A) must be first pulled up to spontaneously raise up the movable base 1 together until the upholding feet 41 fitted inside the connecting block 2 are stopped and confined in the stopping groove 100 of the adjusting opening 10. By the time, the upholding feet 41 are to be squeezed by the narrow wall of the stopping groove 100 to move toward each other to keep the locking projection 412 engaged with the locking groove 413. Then, push down the backrest (A) to bring the movable base 1 together to move down. Relatively, the upholding feet 41 connected in the connecting block 2 are thus moved upward in the adjusting opening 10. As the upholding feet 41 have their inner walls contacting the projection 230, they can be restricted by the projection 230 to move up steadily without swinging until they are blocked and forced by the projection portion 101 of the adjusting opening 10 to get separated. By the time, expanded by the elasticity of the spring 43, the upholding feet 41 are to be respectively pushed to and fit with a pair of the V-shaped grooves 102 of the adjusting opening 10, with the backrest (A) positioned at the lowest level. If the backrest (A) is to be heightened, it just needs to be pulled up to spontaneously raise the movable base 1 together to a needed height, with the upholding feet 41 smoothly squeezed by the slope of the adjusting opening 10 to compress the spring 43 until moved to another pair of the V-shaped grooves 102 of the adjusting opening 10; by the time, the upholding feet 41 are to be pushed outward by the spring 43 to enter a lower pair of the V-shaped grooves 102 of the adjusting opening 10; so, with the sequence of the V-shaped grooves 102 formed in the adjusting opening 10, the height of the backrest (A) can be altered according to preference of a user. Moreover, while the movable base 1 is moving in the connecting block 2, the stabilizing unit 3 is to be squeezed by the inner wall 12 of the movable base 1 to be elastically compressed so as to reversely press on the inner wall 12, thus enabling the movable base 1 to steadily move along the connecting block 2 without swinging.

Figure 8:
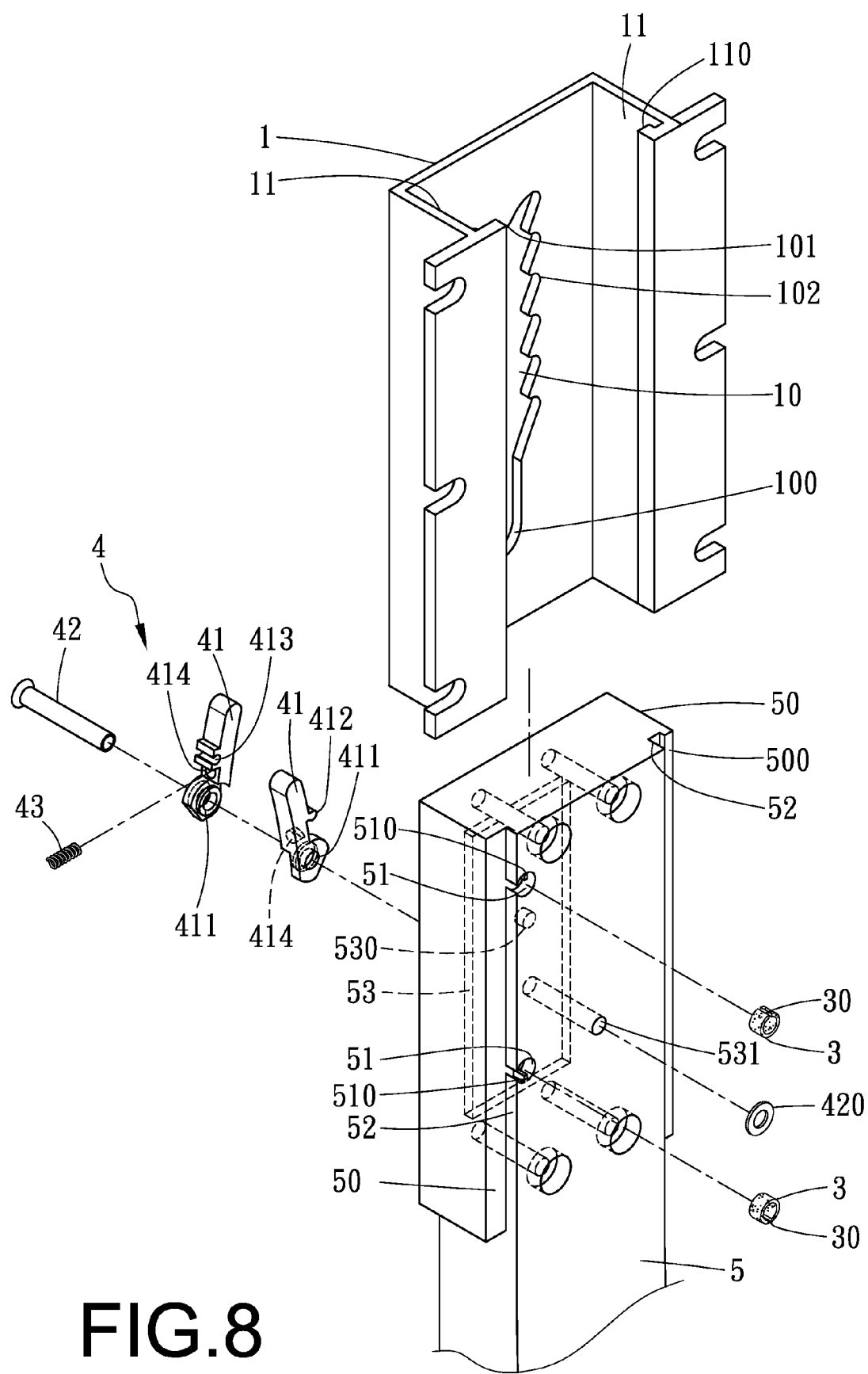
FIG. 8 is an exploded perspective view of a second preferred embodiment of an adjusting device of a chair backrest in the present invention.
Figure 9:
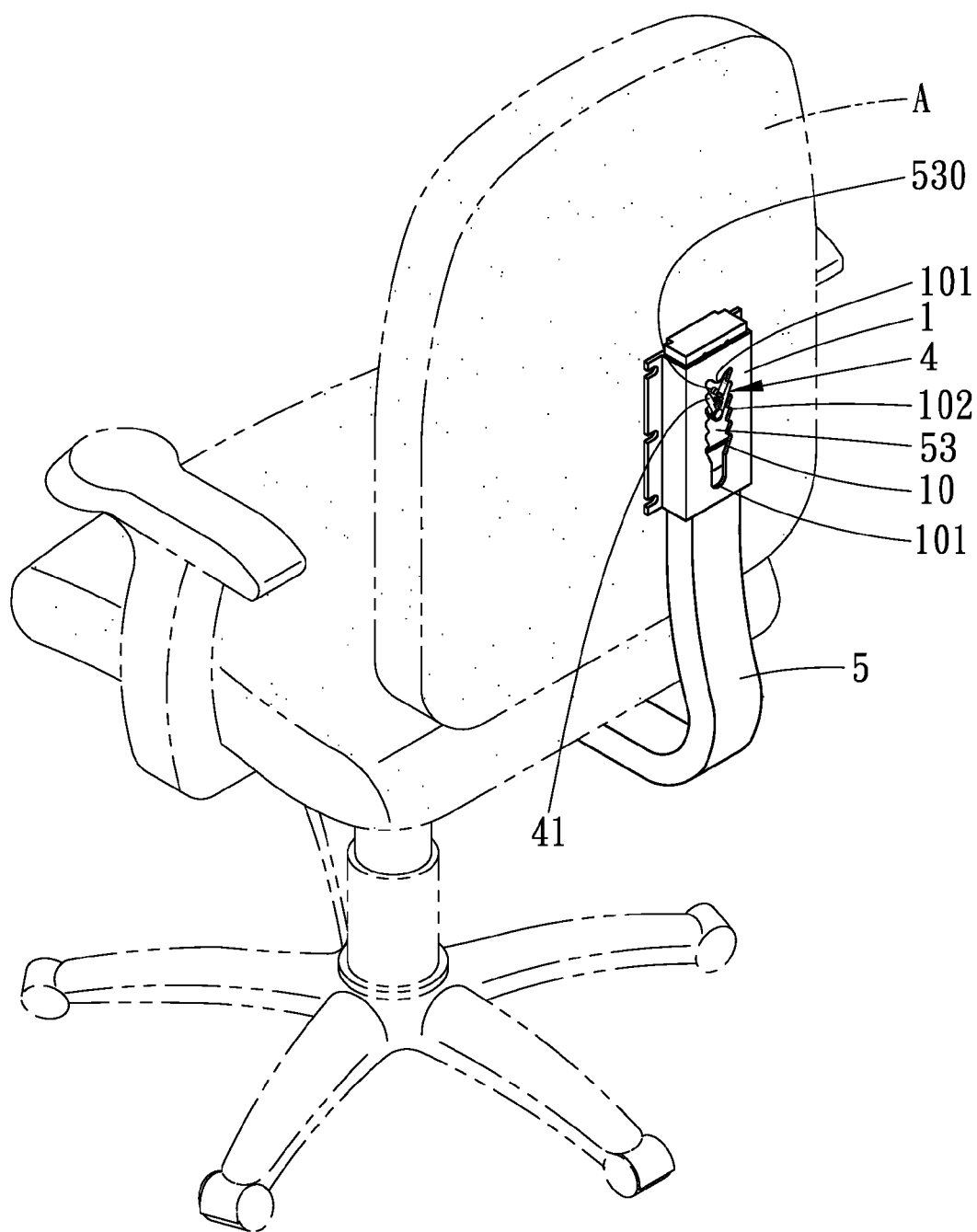
FIG. 9 is a perspective view of the second preferred embodiment of an adjusting device of a chair backrest in the present invention, showing it fixed on the backrest.

As shown in FIGS. 8 and 9, a second preferred embodiment of an adjusting device of a chair backrest in the present invention has the same components as the first embodiment does, except that the connecting block 2 is integrally formed with a connecting rod 5 employed to connect a seat with a backrest. The connecting rod 5 is provided with a side wing 50 protruded at its two sides respectively for plugging inside the sliding rail 11 of the movable base 1, at least a circular notch 51 cut at its one side, a sidewall 52 formed at its two sides respectively to contact with the inner wall 12 of the movable base 1, and a rectangular recess 53 formed in its front wall to correspond to the adjusting opening 10 of the movable base 1. One of the side wings 50 has a long projecting ridge 500 corresponding to the blocking wall 110 of the sliding rail 11 of the movable base 1. Protruded from the inner wall of the notch 51 is a locking projection 510. The rectangular recess 53 is provided with a projection 530 formed at a proper position, and a through hole 531 properly bored below the projection 530.

In assembling the adjusting device, the stabilizing ring 3 is first fitted in the notch 51 of the connecting rod 5, with the slot 30 of the stabilizing ring 3 engaged with locking projection 510 of the notch 51. Next, two ends of the spring 43 are put into the spring grooves 414 of the upholding feet 41, with the pivotal holes 411 of the upholding feet 41 exactly corresponding to each other and the locking projection 412 fitted in the locking groove 413. Then, the previously assembled components of the positioning unit 4 is installed in the rectangular recess 53 of the connecting rod 5, with the projection 530 positioned between the upholding feet 41 to keep the pivotal holes 411 exactly corresponding to the through hole 531. The pivotal pin 42 is successively inserted through the pivotal holes 411 and the through hole 531 and then fixed with washer 420 by pressing. Finally, the movable base 1 is fixed with the backrest (A).

In using, when the backrest (A) is to be altered in its height, it as well needs to be pulled up and pushed down to move the movable base 1 so as to enable the positioning unit 4 confined in the connecting rod 5 to function as the first embodiment does.

While the preferred embodiment of the invention has been described above, it will be recognized and understood that various modifications may be made therein and the appended claims are intended to cover all such modifications that may fall within the spirit and scope of the invention.

What is claimed is:

1. An adjusting device of a chair backrest, said adjusting device comprising:

a movable base provided with an adjusting opening in a front wall, said adjusting opening having plural continual V-shaped grooves in two vertical sidewalls respectively, a bottom portion of said adjusting opening formed with a stopping groove and a top end of said adjusting opening formed with a projecting-downward portion, said movable base further having a sliding rail formed in two sides respectively;

a connecting block fitted in said movable base and provided with a side wing formed at two vertical sides respectively for plugging inside said sliding rail of said movable base, a rectangular recess formed in a front wall of said connecting block and provided with a projection on an intermediate portion and a through hole bored below said projection; and a positioning unit assembled within said rectangular recess of said connecting block and provided with two upholding feet respectively bored with a pivotal hole, a pivotal pin used to be inserted through said pivotal holes of said upholding feet and said through hole of said connecting block and then fixed with a washer by pressing so as to keep said positioning unit jointed with said connecting block, one of said upholding feet provided with a locking projection corresponding to a locking groove provided in another said upholding foot, a spring installed between an inner wall of said upholding feet to expand said upholding feet to fit in one of plural pairs of said V-shaped grooves of said adjusting opening of said movable base.

2. The adjusting device of a chair backrest as claimed in claim 1, wherein one of said sliding rails of said movable base is provided with a long blocking wall vertically projected from its inner end, and an inner wall is formed to extend sidewise in parallel to said front wall from each of said sliding rails.

3. The adjusting device of a chair backrest as claimed in claim 1, wherein one of said side wings has a long projecting ridge, and at least a circular notch is cut at one side of said connecting block and provided with a locking projection formed on its inner wall, and a side wall is formed at two sides of said connecting block respectively.

4. The adjusting device of a chair backrest as claimed in claim 3, wherein a stabilizing ring made of plastics is inserted in said notch of said connecting block and provided with a slot.

5. An adjusting device of a seat back, said adjusting device comprising:

a movable base provided with an adjusting opening in a front wall, said adjusting opening having plural continuous V-shaped grooves in two vertical sidewalls respectively, a bottom portion of said adjusting opening formed with a stopping groove, a top end of said adjusting opening formed with a projecting-downward portion, a sliding rail formed in two sides of said movable base respectively;

a connecting rod of a chair fitted in said movable base and provided with a side wing formed at its two sides respectively for plugging inside said sliding rail of said movable base, a rectangular recess formed in a front wall of said connecting rod and provided with a projection on an intermediate portion and a through hole bored below said projection; and a positioning unit assembled within said rectangular recess of said connecting rod and provided with two upholding feet respectively bored with a pivotal hole, a pivotal pin used to be inserted through said pivotal holes of said upholding feet and said through hole of said connecting rod and then fixed with a washer by pressing so as to keep said positioning unit jointed with said connecting rod, one of said upholding feet provided with a locking projection corresponding to a locking groove provided in another said upholding foot, a spring installed between an inner wall of said upholding feet to expand said upholding feet wide.

6. The adjusting device of a seat back as claimed in claim 5, wherein each of said upholding feet of said positioning unit is provided with a spring groove formed in its inner wall.

7. The adjusting device of a seat back as claimed in claim 5, wherein one of said sliding rails of said movable base is provided with a long blocking ridge vertically projected from its inner end, and an inner wall is formed to extend sidewise in parallel to said front wall from each of said sliding rails.

8. The adjusting device of a seat back as claimed in claim 5, wherein one of said side wings has a long projection ridge, and at least a circular notch is cut at one side of said connecting rod and provided with a locking projection formed on its inner wall, and a side wall is formed at two sides of said connecting rod respectively.

9. The adjusting device of a seat back as claimed in claim 8, wherein a stabilizing ring made of plastics is inserted in said notch of said connecting rod and provided with a slot.

* * * * *